US011111806B2

(12) United States Patent
Clark et al.

(10) Patent No.: US 11,111,806 B2
(45) Date of Patent: Sep. 7, 2021

(54) BLADE OUTER AIR SEAL WITH CIRCUMFERENTIAL HOOK ASSEMBLY

(71) Applicant: United Technologies Corporation, Farmington, CT (US)

(72) Inventors: Thomas E. Clark, Sanford, ME (US); William M. Barker, North Andover, MA (US); Daniel J. Whitney, Topsham, ME (US)

(73) Assignee: Raytheon Technologies Corporation, Farmington, CT (US)

( * ) Notice: Subject to any disclaimer, the term of this patent is extended or adjusted under 35 U.S.C. 154(b) by 136 days.

(21) Appl. No.: 16/055,511

(22) Filed: Aug. 6, 2018

(65) Prior Publication Data

US 2020/0040756 A1 Feb. 6, 2020

(51) Int. Cl.
| *F01D 11/12* | (2006.01) |
| *F01D 9/04* | (2006.01) |
| *F01D 25/24* | (2006.01) |
| *F01D 25/28* | (2006.01) |

(52) U.S. Cl.
CPC ............... *F01D 11/12* (2013.01); *F01D 9/04* (2013.01); *F01D 25/246* (2013.01); *F01D 25/28* (2013.01); *F05D 2240/11* (2013.01); *F05D 2240/55* (2013.01); *F05D 2240/91* (2013.01); *F05D 2300/6033* (2013.01)

(58) Field of Classification Search
CPC ........ F01D 25/246; F01D 25/24; F01D 11/08; F01D 11/005; F01D 9/04; F04D 29/526
See application file for complete search history.

(56) References Cited

U.S. PATENT DOCUMENTS

| 5,988,975 | A | * | 11/1999 | Pizzi | F01D 11/005 |
| | | | | | 415/139 |
| 7,052,235 | B2 | * | 5/2006 | Alford | F01D 9/04 |
| | | | | | 415/173.1 |
| 7,360,989 | B2 | * | 4/2008 | Amiot | F01D 9/04 |
| | | | | | 415/138 |
| 8,123,473 | B2 | * | 2/2012 | Shapiro | F01D 25/14 |
| | | | | | 415/173.1 |

(Continued)

FOREIGN PATENT DOCUMENTS

| EP | 3106620 A1 | 12/2016 |
| WO | 2015/138027 A2 | 12/2014 |

OTHER PUBLICATIONS

European Search Report for EP Application No. 19190123.0 dated Jan. 24, 2020.

*Primary Examiner* — Richard A Edgar
*Assistant Examiner* — Jackson N Gillenwaters
(74) *Attorney, Agent, or Firm* — Carlson, Gaskey & Olds, P.C.

(57) ABSTRACT

A gas turbine engine includes a compressor section and a turbine section. The turbine section includes at least one rotor and at least one blade extending radially outwardly from the rotor to a radially outer tip. A blade outer air seal assembly is positioned radially outwardly of the radially outer tip of the blade. The blade outer air seal has forward and aft hooks, and the forward and aft hooks are supported on forward and aft seal hooks of an attachment block. The blade outer air seal forward and aft hooks extend at angles relative to an upper surface of a web that is between 20 and 70 degrees. A method is also disclosed.

4 Claims, 5 Drawing Sheets

(56) References Cited

U.S. PATENT DOCUMENTS

| | | | |
|---|---|---|---|
| 8,439,639 B2* | 5/2013 | Joe | F01D 5/187 |
| | | | 416/97 R |
| 9,267,388 B2* | 2/2016 | Mizokami | F01D 9/04 |
| 9,903,228 B2* | 2/2018 | Durie | F02C 7/04 |
| 9,938,846 B2* | 4/2018 | Freeman | F01D 25/246 |
| 10,458,263 B2* | 10/2019 | Sippel | F01D 11/005 |
| 2004/0141838 A1* | 7/2004 | Thompson | F01D 25/246 |
| | | | 415/209.3 |
| 2009/0096174 A1* | 4/2009 | Spangler | F01D 11/08 |
| | | | 277/345 |
| 2016/0215645 A1* | 7/2016 | McCaffrey | F01D 11/08 |
| 2016/0222828 A1* | 8/2016 | McCaffrey | F01D 25/24 |
| 2017/0298777 A1 | 10/2017 | Lamusga | |
| 2017/0350268 A1 | 12/2017 | McCaffrey | |
| 2018/0149042 A1* | 5/2018 | Freeman | F01D 11/08 |
| 2020/0095893 A1* | 3/2020 | Blaney | B32B 18/00 |
| 2020/0149477 A1* | 5/2020 | Barker | F01D 11/127 |

\* cited by examiner

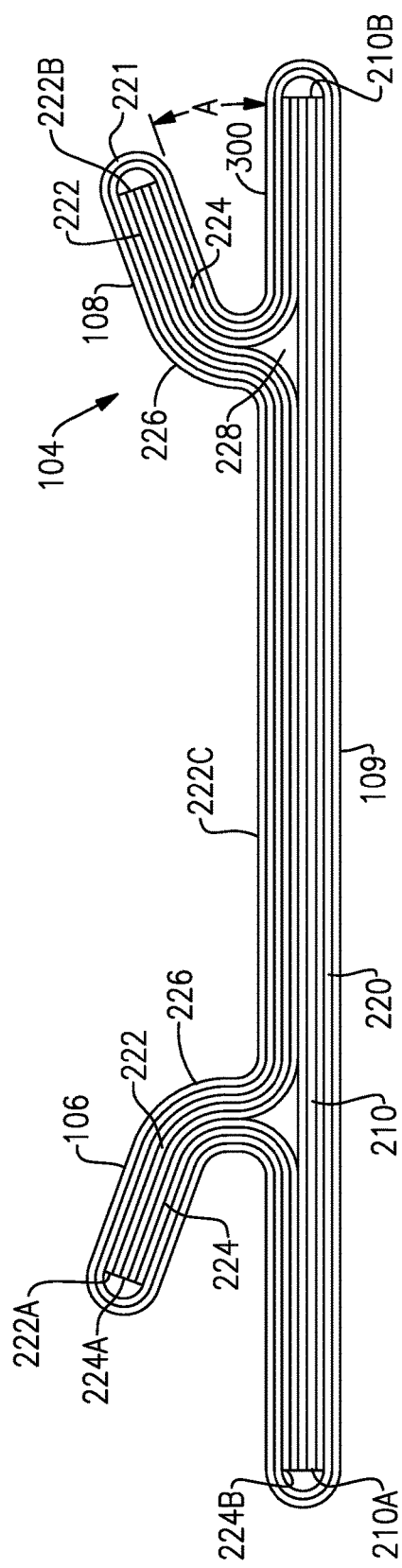
FIG.3
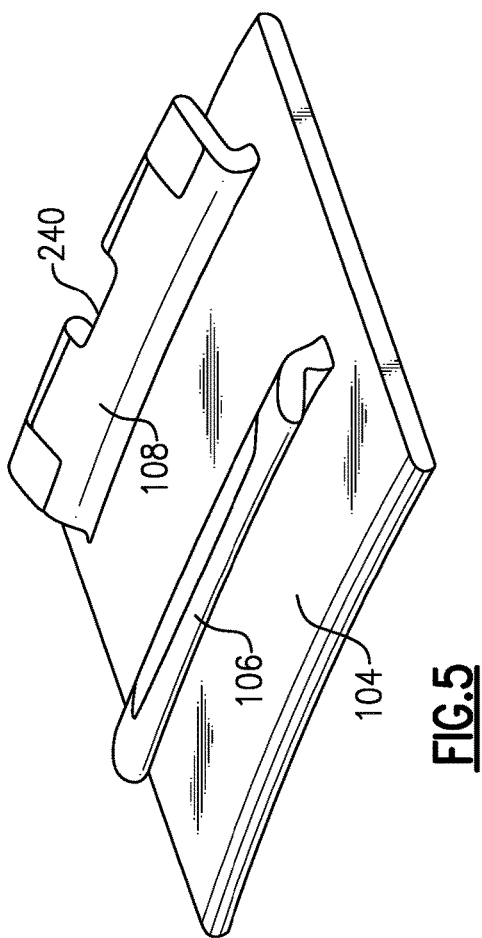
FIG.5
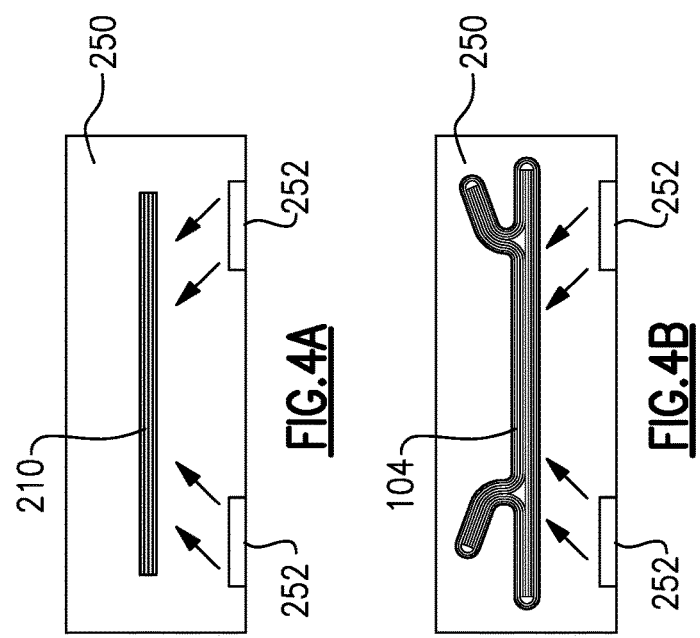
FIG.4A
FIG.4B

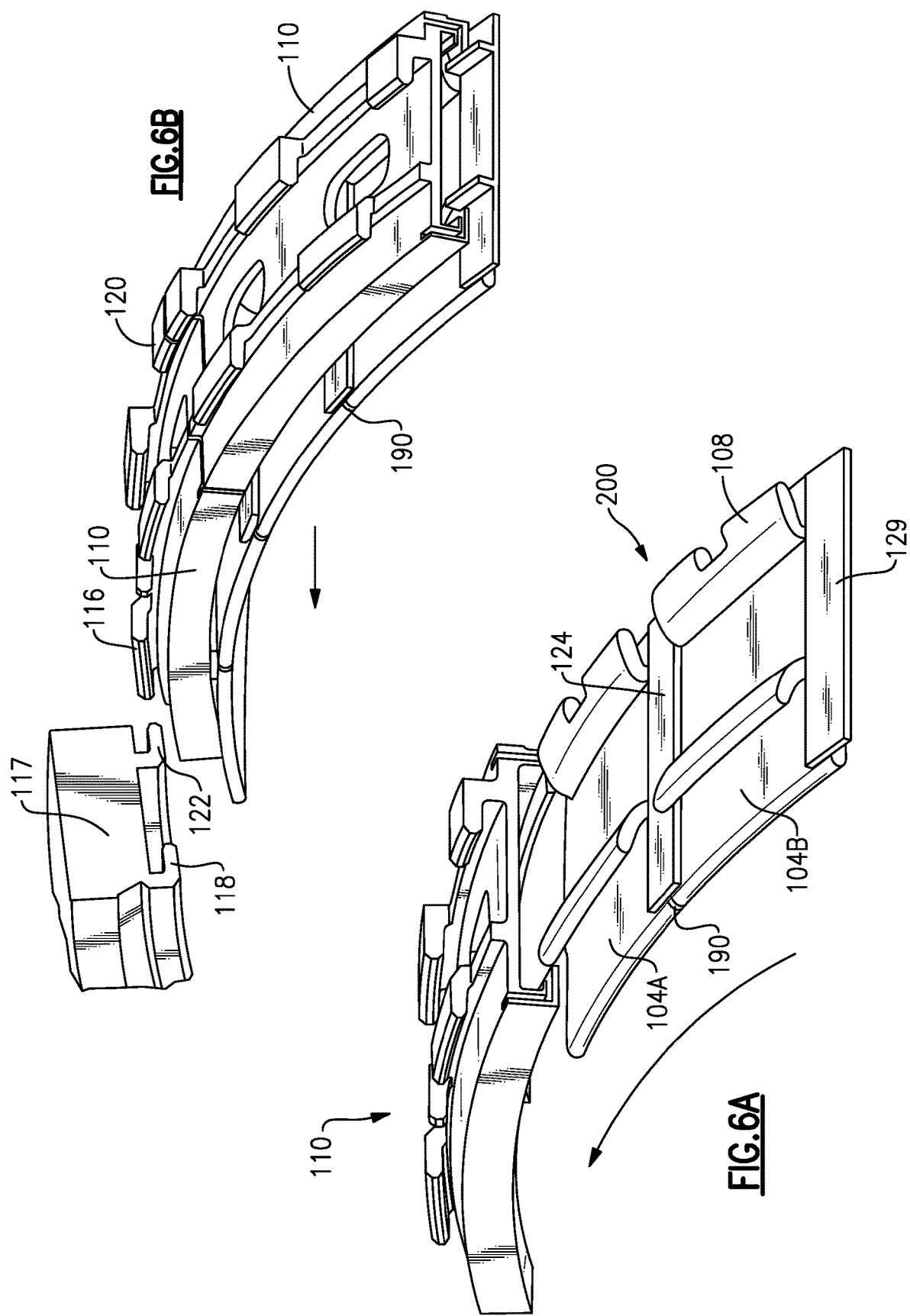

BLADE OUTER AIR SEAL WITH CIRCUMFERENTIAL HOOK ASSEMBLY

BACKGROUND

This application relates to a blade outer air seal having support hooks which facilitate assembly.

Gas turbine engines are known and typically include a compressor compressing air and delivering it into a combustor. The air is mixed with fuel in the combustor and ignited. Products of the combustion pass downstream over turbine rotors, driving them to rotate.

It is desirable to ensure that the bulk of the products of combustion pass over turbine blades on the turbine rotor. As such, it is known to provide blade outer air seals radially outwardly of the blades.

Blade outer air seals raise challenge in effectively mounting their assemblies to the engines.

SUMMARY

In a featured embodiment, a gas turbine engine includes a compressor section and a turbine section. The turbine section includes at least one rotor and at least one blade extending radially outwardly from the rotor to a radially outer tip. A blade outer air seal assembly is positioned radially outwardly of the radially outer tip of the blade. The blade outer air seal has forward and aft hooks, and the forward and aft hooks are supported on forward and aft seal hooks of an attachment block. The blade outer air seal forward and aft hooks extend at angles relative to an upper surface of a web that is between 20 and 70 degrees.

In another embodiment according to the previous embodiment, the blade outer air seal formed of a plurality of laminate layered with a central web formed of a plurality of laminate members including an inner reinforcement member, and an outer overwrap that wraps around the inner reinforcement member, and radially outwardly and across the forward and aft hooks.

In another embodiment according to any of the previous embodiments, the plurality of laminate members have a fibrous woven structure.

In another embodiment according to any of the previous embodiments, there are hook plies positioned to define each of the hooks, and radially outward of the inner reinforcement member.

In another embodiment according to any of the previous embodiments, spaces are defined radially between the hook plies and the inner reinforcement member and loose fibers are received within the spaces.

In another embodiment according to any of the previous embodiments, wedge seals are positioned across circumferential gaps between the plurality of blade outer air seals.

In another embodiment according to any of the previous embodiments, the attachment block has a forward case mount hook and an aft case mount hook. The attachment block is supported on a forward case hook and an aft case hook of a static casing within in the engine.

In another embodiment according to any of the previous embodiments, the aft case mount is hooked on the attachment block and the forward case mount hook on the attachment block face in a first common axial direction, and the forward case hook and the aft case hook face in a second common axial direction which is opposed to the first common axial direction.

In another embodiment according to any of the previous embodiments, the forward case mount hook and the aft case mount hook being circumferentially offset and the forward case hook and the aft case hook also being circumferentially offset.

In another embodiment according to any of the previous embodiments, wedge seals are positioned across circumferential gaps between the plurality of blade outer air seals.

In another embodiment according to any of the previous embodiments, the attachment block has a forward case mount hook and an aft case mount hook. The attachment block is supported on a forward case hook and an aft case hook of a static casing within in the engine.

In another embodiment according to any of the previous embodiments, the aft case mount is hooked on the attachment block and the forward case mount hook on the attachment block face in a first common axial direction, and the forward case hook and the aft case hook face in a second common axial direction which is opposed to the first common axial direction.

In another embodiment according to any of the previous embodiments, the forward case mount hook and the aft case mount hook are circumferentially offset and the forward case hook and the aft case hook also are circumferentially offset.

In another embodiment according to any of the previous embodiments, the attachment block has a forward case mount hook and an aft case mount hook. The attachment block is supported on a forward case hook and an aft case hook of a static casing within in the engine.

In another embodiment according to any of the previous embodiments, the aft case mount is hooked on the attachment block and the forward case mount hook on the attachment block face in a first common axial direction, and the forward case hook and the aft case hook face in a second common axial direction which is opposed to the first common axial direction.

In another embodiment according to any of the previous embodiments, the forward case mount hook and the aft case mount hook are circumferentially offset and the forward case hook and the aft case hook also are circumferentially offset.

In another featured embodiment, a method of assembling a blade outer air seal assembly into a gas turbine engine includes the steps of providing a plurality of blade outer air seals having forward and aft hooks extending at angles relative to an upper surface of a web that is between 20 and 70 degrees. The forward and aft hooks slide onto forward and aft blade outer air seal hooks on an attachment block. Forward and an aft case mount hooks are provided on the attachment block. Forward and the aft case mount hooks on the attachment blocks face a first common axial direction. The forward and aft case mount hooks move on the attachment blocks onto forward and aft case hooks on a static casing, with the forward and aft case hooks on the static casing also facing a second common axial direction, which is opposed to the first common axial direction.

In another embodiment according to the previous embodiment, the wedge seals are positioned across circumferential gaps between the plurality of blade outer air seals.

In another embodiment according to any of the previous embodiments, the casing extends as a full hoop structure about an axis of rotation of the turbine rotor.

In another embodiment according to any of the previous embodiments, the casing extends as a full hoop structure about an axis of rotation of the turbine rotor.

These and other features may be best understood from the following drawings and specification.

BRIEF DESCRIPTION OF THE DRAWINGS

FIG. 3 is a cross-sectional view through a blade outer air seal.
FIG. 4A shows a first method step.
FIG. 4B shows a subsequent step.
FIG. 5 shows a feature.
FIG. 6A shows a first assembly step.
FIG. 6B shows a subsequent assembly step.

DETAILED DESCRIPTION

Figure 1:
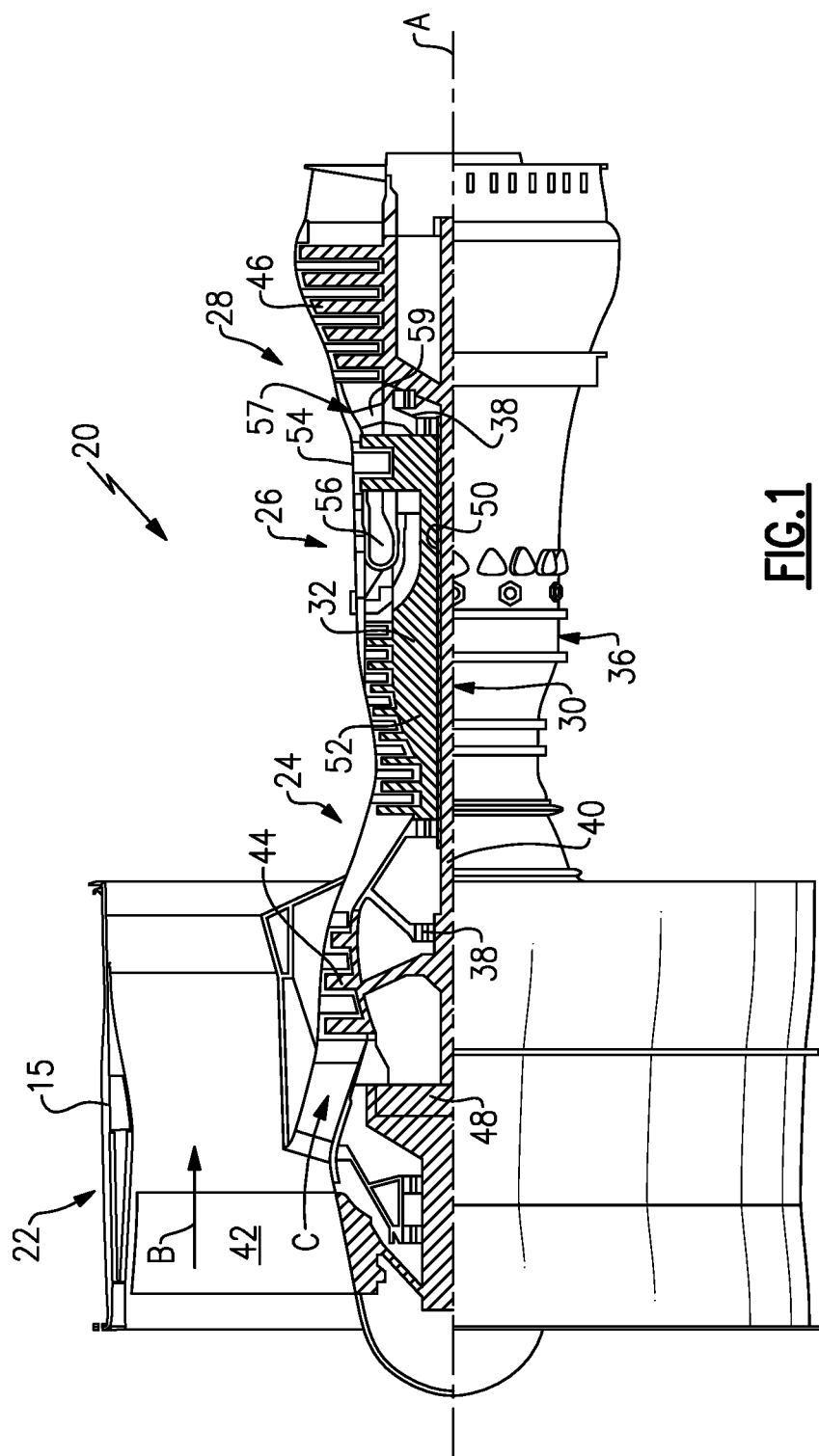
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°R)]^{0.5}$. The "Low corrected fan tip speed" as disclosed herein according to one non-limiting embodiment is less than about 1150 ft/second (350.5 meters/second).

Figure 2:
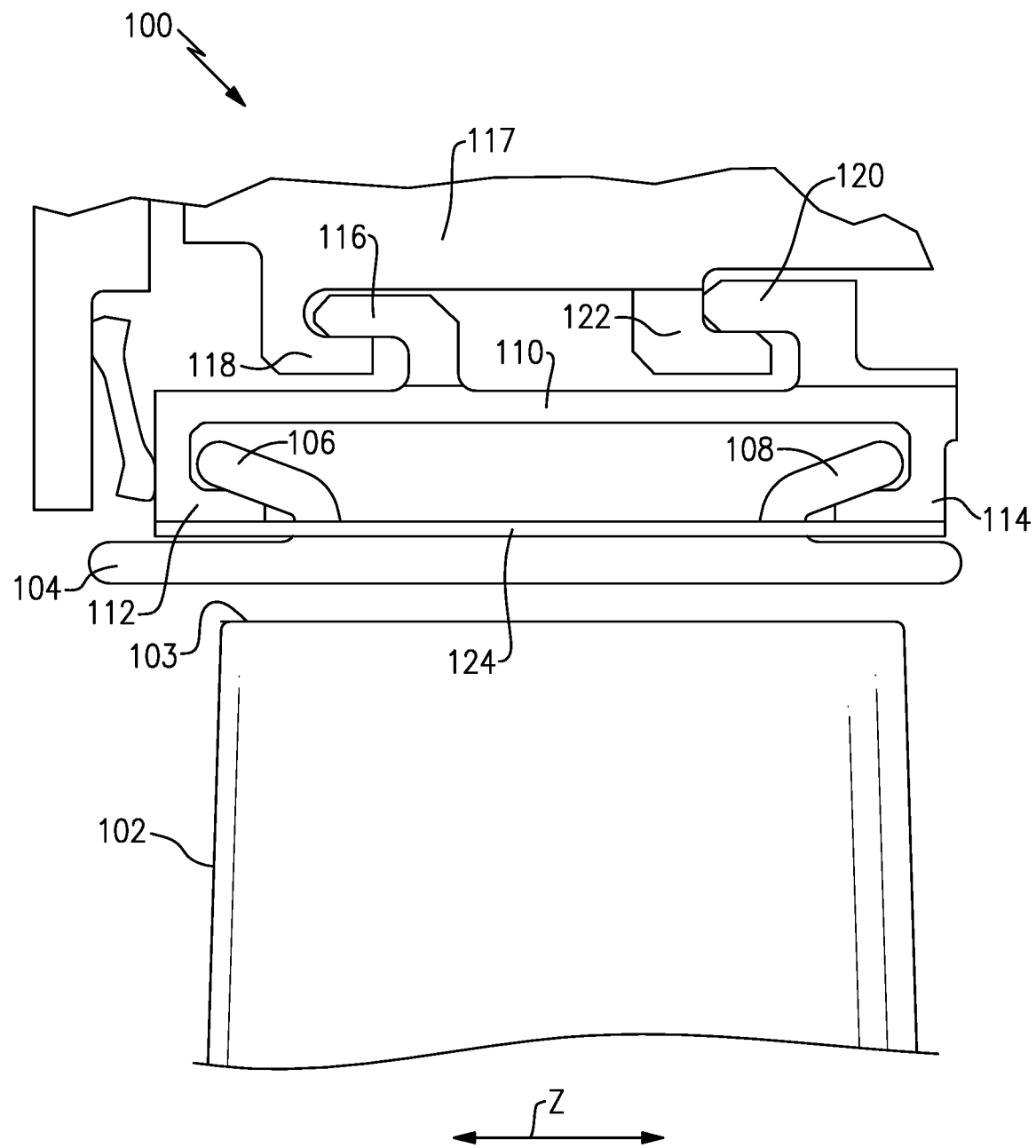
FIG. 2 shows a turbine section.

FIG. 2 shows a turbine section 100, which may be incorporated into a gas turbine engine such as the one shown in FIG. 1. However, it should be understood that the turbine section 100 could be utilized in other gas turbine engines, and even gas turbine engines not having a fan section at all.

A turbine blade 102 has a radially outer tip 103 that is spaced from a blade outer air seal ("BOAS") 104. The BOAS may be formed of a ceramic matrix composite ("CMC"). A forward hook 106 and an aft hook 108 are formed on the BOAS 104. A support block 110 includes a rearwardly facing forward hook 112 supporting forward hook 106 and a forwardly facing aft hook 114 supporting aft hook 108.

As shown, the attachment block 110 is supported on a static support or engine case 117. Case 117 has a rearwardly facing forward hook 118 supporting forwardly facing forward hook 116 of the attachment block 110. The case 117 has a rearwardly facing aft hook 122 supporting a forwardly facing aft hook 120 on the attachment block. Case 117 may extend for a full 360° about a rotational axis Z of blade 102.

It should be understood that the arrangement of the hooks 118 and 120 and 116 and 118 could be reversed such that hooks 118 and 122 face forwardly and hooks 116 and 120 face rearwardly. However, in one aspect of this disclosure, the hooks 116 and 120 face in a common axial direction and the hooks 118 and 122 face in an opposed axial direction.

A wedge seal 124 can also be seen.

FIG. 3 shows the BOAS 104 having hooks 106 and 108 and a central web 109.

The BOAS 104 is formed of a ceramic matrix composite ("CMC") material. The BOAS is formed of a plurality of CMC laminates. The laminates may be silicon carbide fibers, formed into a woven fabric in each layer. The fibers may be coated by a boron nitride.

Generally in the prior art there have been only a few laminate in a central web 109. In this disclosure there are additional laminate. As shown, there are central reinforcement laminate 210 and outer plies 220. The outer over wrap 220 extending to form radially outer and radially inner portions of each of the forward and aft hooks, and radially inner and radially outer portions of the central web, and also on an opposed axial sides of the central web relative to the forward and aft hooks. There are hook reinforcement plies 222 extending across the web 109 and into each of the hook areas. There are also inner front and aft plies 224 forming radially inner portions of the hooks 106 and 108. As is clear from FIG. 3 central reinforcement laminate 210 extends from one end 210A to another end 210B, with the entirety of said central reinforcement laminate being outside of the hooks 106 and 108. The hook reinforcement plies 222 have an end 222A within one of the hooks 106, and extend through a portion 222C along and radially outwardly of the central reinforcement laminate 210, and between hooks 106 and 108. The hook reinforcement plies 222 extend to a remote end 222B within the other of the hooks 108. The inner front and aft plies 224 extend from an end 224A which is within one of the hooks 106 and 108, and to a remote end 224B which is remote from the hooks and radially outward of the central reinforcement plies 210.

The use of several laminates in the web 109 provides benefits. However, it is generally desirable to add additional material to make the laminates more stiff than their free woven fiber state. Thus, a process known as densification is utilized to increase the density of the laminate material after assembly. If too many laminate are formed in the central web, the radially more central laminate may not be adequately densified.

Thus, as shown in FIG. 4A the reinforcement plies in member 210 are initially stiffened in a densification chamber 250 as a separate densification process. Injectors 252 are schematically shown which inject materials such, as a silicon carbide matrix material, into spaces between the fibers in the woven layers. This may be utilized in the FIG. 4A step to provide 100% of the desired densification, or only some percentage. As an example, this initial step may be utilized to form between 10 and 90% of a desired densification.

One hundred percent densification may be defined as the theoretical upper limit of layers being completely saturated with the matrix and about the fibers, such that no additional material may be deposited. In practice, 100% may be difficult to achieve.

As shown in FIG. 4B, the entire BOAS 104 is then formed with the additional layers, and having the overwrap plies 220 wrapping over the hook portions 222/224 and the reinforcement portion 210, and then additional densification occurs to all of these areas.

Returning to FIG. 3, spaces between the spaces 228 between the laminate 222 and 224 may be filled with loose fibers, and in the densification process these will also be filled to harden.

In addition, it can be seen that the hooks 106 and 108 do not extend in a direction which is perpendicular to the vertical, or parallel to the axis of rotation Z (see FIG. 2). Rather, the angle A is at some intermediate angle between 20 and 70 degrees relative to an upper surface 300 of the BOAS, and radially inward of the hook.

The angle A can be taken as measured from an averaged position along the hook measured relative to an axis taken parallel to the rotational axis. That is, in practice the hook may not extend along any straight line.

In embodiments the angle A may be between 20 and 70 degrees. Outer surface 226 of hooks 106/108 are curved, not sharp cornered. This positioning facilitates the assembly of the BOAS, as will be explained below.

Further details of the method and structure of the BOAS as described to this point can be found in co-pending application Ser. No. 16/055,636, filed on even date herewith, owned by the Assignee of this application, and entitled "Blade Outer Air Seal Reinforcement Laminate."

FIG. 5 shows BOAS 104 having hooks 106 with 108 and a notch 240 that will catch on a tab on an attachment block to resist rotation.

FIGS. 6A and 6B show the assembly into the casing 117.

FIG. 6A shows an assembly detail. An intermediate product 200 is provided wherein a plurality of BOAS 104A and 104B are assembled with at least one wedge seal 124 circumferentially intermediate attachment hooks on the BOAS 104A and 104B and sealing gaps 190 between BOAS 104A/B.

This intermediate product 200 is then slid circumferentially within a plurality of attachment blocks 110, as shown in FIG. 6B. Hooks 106 and 108, being at the non-perpendicular angle, facilitate this movement.

Figure 6C:
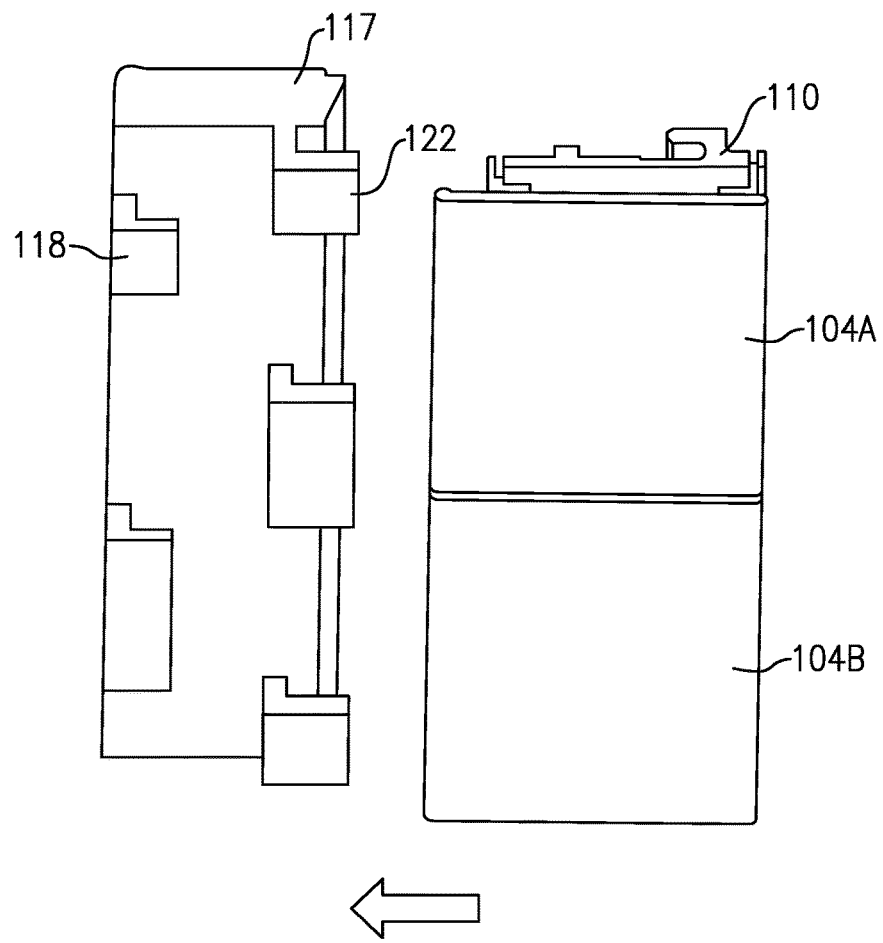
FIG. 6C shows a detail of the FIG. 6B step.

The forward facing hooks 116 and 120 now facilitate movement of the assembly into the full hoop case or attachment structure 117. That is, the hooks 116 and 120 can move in a single axial direction onto the hooks 118 and 122 such that a full hoop support 117 can be utilized and still facilitate the easy assembly of the BOAS assembly. As shown in FIG. 6C, the single axial direction is a forward direction.

As understood, the term "full hoop" means that the casing 117 extends for 360° about an axis of rotation X of the turbine, such as shown in FIG. 2, as an example.

As shown in FIG. 6C the forward case hooks 118 and aft case hooks 122 are circumferentially offset. This facilitates the movement of the combined attachment blocks 110 and BOAS 104A and B as shown in FIG. 6B into a mount position on the casing 117.

Figure 6D:
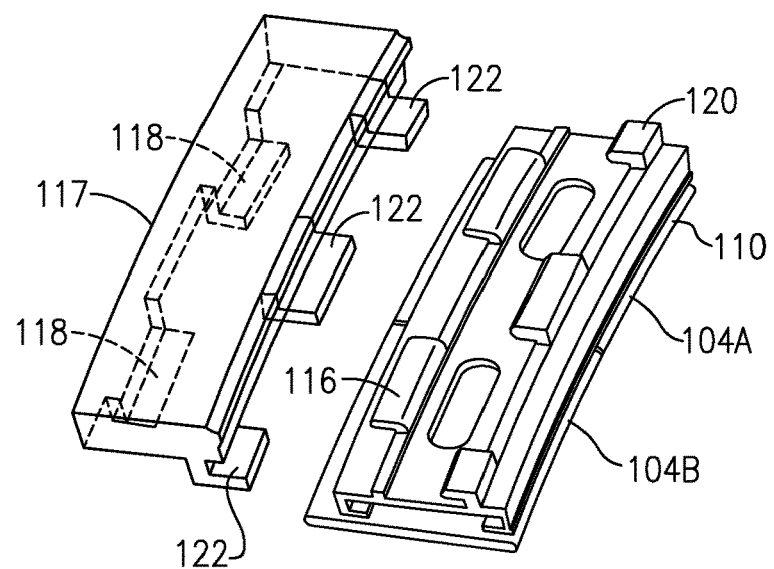
FIG. 6D shows further details.

As shown in FIG. 6D the forward case mount hooks 116 and the aft case hooks 122 are also circumferentially offset. As can be appreciated from FIG. 6D hooks 116 can be moved intermediate the hooks 122 such that the hooks 116 can then register and be supported on the hooks 118, with the hooks 120 then being supported on the hooks 122.

Thus, a full hoop casing 117 can be utilized while still easily receiving and supporting the combined BOAS and attachment block structure.

A method of assembling a blade outer air seal assembly into a gas turbine engine could be said to includes the steps of providing a plurality of blade outer air seals having forward and aft hooks extending at angles relative to an upper surface of a web that is between 20 and 70 degrees. The forward and aft hooks are slid onto forward and aft blade outer air seal hooks on an attachment block. Forward and aft case mount hooks on the attachment block are provided. Forward and the aft case mount hooks on the attachment blocks face a first common axial direction. There is the step of moving the forward and aft case mount hooks on the attachment blocks onto forward and aft case hooks on a static casing, with the forward and aft case hooks on the static casing also facing a second common axial direction, which is opposed to the first common axial direction.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A gas turbine engine comprising:
   a compressor section and a turbine section, said turbine section including at least one rotor and at least one blade extending radially outwardly from said rotor to a radially outer tip;
   a blade outer air seal assembly including a plurality of blade outer air seals, positioned radially outwardly of said radially outer tip of said blade, each said blade outer air seal having forward and aft hooks, and said forward and aft hooks being supported on forward and aft seal hooks of an attachment block, said forward and aft seal hooks of said attachment block both facing forwardly;
   said attachment block is supported on forward and aft case hooks on a static casing, with said forward and aft case hooks on said static casing both facing rearwardly;
   said blade outer air seal forward and aft hooks extending at angles relative to an upper surface of a web that is between 20 and 70 degrees, each of said angles are measured as an averaged position along a length of the hook measured relative to an axis taken parallel to a rotational axis of said gas turbine engine;
   wherein said blade outer air seal is formed of a plurality of laminate layered with a central web formed of a plurality of laminate members including an inner reinforcement member, and an outer overwrap that wraps around said inner reinforcement member, and radially outwardly and across said forward and aft hooks, and said inner reinforcement member not forming a portion of said blade outer air seal forward and aft hooks;
   wherein said plurality of laminate members have a fibrous woven structure;
   wherein there are hook reinforcement plies positioned to define each of said blade outer air seal forward and aft hooks, and radially outward of said inner reinforcement member, and there being inner front and aft plies positioned partially within each of said blade outer air seal forward and aft hooks, and extending outwardly of each of said blade outer air seal forward and aft hook to be radially outward of said inner reinforcement member;
   wherein spaces are defined radially between said hook reinforcement plies, said inner reinforcement member, and each said inner forward and aft plies and loose fibers are received within said spaces;
   wherein wedge seals are positioned across circumferential gaps between a plurality of said blade outer air seals;
   wherein said attachment block has a forward case mount hooks and an aft case mount hook, and said attachment block being supported on a forward case hook and an aft case hook of a static casing within the engine, said aft case mount hook on said attachment block and said forward case mount hook on said attachment block facing in a first common axial direction, and said forward case hook and said aft case hook facing in a second common axial direction which is opposed to said first common axial direction; and
   wherein said forward case mount hook and said aft case mount hook being circumferentially offset and said forward case hook and said aft case hook being circumferentially offset, and said forward case mount hooks on said attachment blocks being offset from said aft case hooks on said static casing, such that said forward case mount hooks on said attachment blocks can move axially circumferentially intermediate said aft case hooks on said static casing during an assembly.

2. The gas turbine engine as set forth in claim 1, wherein said inner reinforcement member extending between a first end and a second end, with said first and second ends of said inner reinforcement member both being remote from said forward and aft hooks of said blade outer air seal, said hook reinforcement plies extending between a first end and a second end, with said first end of said hook reinforcement plies being in one of said blade outer air seal forward and aft hooks, said second end of said hook reinforcement plies being in the other of said blade outer air seal forward and aft hooks, said inner front and aft plies each extending from a first end in one of said blade outer air seal forward and aft hooks, and to a second end of said inner front and aft plies being positioned remotely from said blade outer air seal forward and aft hooks, and radially outward of said inner reinforcement member, and said outer over wrap extending to form radially outer and radially inner portions of each of said blade outer air seal forward and aft hooks, and radially inner and radially outer portions of said central web, and on opposed axial sides of said central web relative to blade outer air seal forward and aft hooks.

3. A method of assembling a blade outer air seal assembly into a gas turbine engine comprising the steps of:
   (a) providing a plurality of blade outer air seals having forward and aft hooks extending at angles relative to an upper surface of a web that is between 20 and 70 degrees;
   (b) providing forward and an aft case mount hooks on an attachment block, and forward and said aft case mount hooks on said attachment blocks facing a first common axial direction; and
   (c) assembling the plurality of blade outer air seals and at least one wedge seal that is circumferentially intermediate to said forward and aft hooks and sealing gaps that are situated between each one of the plurality of blade outer air seals to form an intermediate product; and
   (d) sliding said intermediate product circumferentially within a plurality of attachment blocks; and then
   (e) moving said forward and aft case mount hooks on said attachment blocks onto forward and aft case hooks on a static casing, said static casing extending as a whole hoop structure about an axis of rotation of the gas turbine engine with forward and aft case hooks on said static casing facing a second common axial direction, which is opposed to said first common axial direction, said forward case mount hooks on said attachment blocks being offset from said aft case hooks on said static casing, such that said forward case mount hooks on said attachment blocks can move axially circumferentially intermediate said aft case hooks on said static casing during the step (e);

wherein the sliding of step (a) is generally in a circumferential direction and the moving of step (e) is generally in a forward direction.

4. The gas turbine engine as set forth in claim 1, wherein a radially outer surface of each of said blade outer air seal forward and aft hooks is curved and without sharp corners.

* * * * *